United States Patent [19]

Rees

[11] 4,251,403
[45] Feb. 17, 1981

[54] PROCESS FOR SIZING FILAMENT YARN UTILIZING AN IMPROVED WARP SIZE COMPOSITION OF PVAL, UREA AND SACCHARIDE

[75] Inventor: Richard W. Rees, Wilmington, Del.

[73] Assignee: E. I. Du Pont de Nemours and Company, Wilmington, Del.

[21] Appl. No.: 100,351

[22] Filed: Dec. 5, 1979

Related U.S. Application Data

[63] Continuation of Ser. No. 901,851, May 1, 1978, abandoned.

[51] Int. Cl.³ .................................................. C08L 5/00
[52] U.S. Cl. ............................ 260/17.4 SG; 428/295; 428/395
[58] Field of Search ............................... 260/17.4 SG

[56] References Cited

U.S. PATENT DOCUMENTS 2,595,276  5/1952  Lowry ........................ 260/17.4 SG

OTHER PUBLICATIONS

Chem. Absts., vol. 71:51204t, Lubricating and Sizing Agent for Glass Fiber, Golosova et al.
Chem. Absts., vol. 73:89097q, Size Mixture for Hydrophobic Weaving Yarns, Yoshimura et al.
Chem. Absts. vol. 81:107718q, Paper Clear Coating Materials, Sakato et al.

*Primary Examiner*—Edward M. Woodberry

[57] ABSTRACT

An improved warp size for filament yarn is provided consisting essentially of polyvinyl alcohol, urea, and mono- and di-saccharides, such as sucrose, which when applied to filament yarn from aqueous solution provides excellent abrasion resistance, low shedding, freedom from skinning, and outstanding ease of removal.

10 Claims, No Drawings

PROCESS FOR SIZING FILAMENT YARN UTILIZING AN IMPROVED WARP SIZE COMPOSITION OF PVAL, UREA AND SACCHARIDE

This is a continuation, of application Ser. No. 901,851, filed May 1, 1978 and now abandoned.

BACKGROUND OF THE INVENTION

1. Field Of The Invention

This invention relates to warp sizes and more specifically it relates to an improved warp size for filament yarns based upon polyvinyl alcohol.

2. Description Of The Prior Art

Polyvinyl alcohol (PVA) has been tried, repeatedly as a warp size for polyester filament yarn but has been rejected due to the undesirable quantity of "shed" that accumulates on the loom. This "shed" consists of fragments of the size that are scraped off the individual yarns by the various areas of high abrasion encountered in weaving, for example the reciprocating action of the reed. As a consequence of this serious problem, PVA is not used as a principle ingredient in polyester filament yarn sizing.

Although urea has been used in conjunction with PVA in warp sizing of spun yarns for several years, this combination is not an acceptable warp size for filament yarns because of the excessive crystallization of urea on the surface of cast films, resulting in powdery shedding and because of the poor viscosity stability in concentrated solutions.

C. R. Williams and D. P. Donermeyer disclosed in the *American Dyestuff Reporter*, June 3, 1968, the addition of sucrose to PVA in order to increase rate of removal of warp size.

Nippon Gohsei disclosed in Japanese Patent Application JA-134571, published on July 7, 1977 the addition of 0.5–5.0 weight percent of mono- or disaccharide, such as glucose, fructose, sucrose and maltose, to aqueous PVA solutions thereby preventing size shedding, fluffing and end-breakage of the warp during weaving. The solids content of the solution was 5–11 weight percent.

United States Patent Application Ser. No. 640,782, filed on Dec. 15, 1975, and now abandoned discloses adhesive compositions that are combinations of (1) polyvinyl alcohol, (2) a crystalline solvent such as urea and (3) a viscosity reducing diluent such as water, liquid polyhydric compounds such as glycols, etc., and optionally extenders, such as starch, clay, etc. These adhesives are disclosed to be suitable for cellulosic substrates providing excellent ambient temperature water resistance while being fully repulpable in hot water. Application of such a combination of PVA, urea and polyhydric alcohol to polyester filament yarns gives very soft, flexible films which tend to cause end-to-end, i.e., yarn-to-adjacent yarn adhesions. Abrasion resistance is only marginal to poor.

SUMMARY OF THE INVENTION

According to the present invention there is provided a composition consisting essentially of (a) from about 40 to about 90% by weight of polyvinyl alcohol having a degree of hydrolysis of from about 88 to about 100 mol % and a solution viscosity of from about 5 to about 50 mPa.s measured as a 4% aqueous solution at a temperature of 20° C., (b) from about 5 to about 30% by weight of urea, and (c) from about 5 to about 30% by weight of saccharide selected from the group consisting of mono- and di-saccharides.

Further provided according to the present invention is the above composition in the form of an aqueous solution having a solids content of from about 3 to about 25% by weight.

DETAILED DESCRIPTION OF THE INVENTION

Various mono- or di-saccharides (e.g., sucrose, sorbitol) were added to a PVA/urea blend and surprisingly it was found that in addition to suppressing the crystallization, adhesion to polyester surfaces was also improved and solution viscosity was stabilized. The resultant three component sizing composition is clearly superior to the prior art sizes. Excellent performance is achieved by employing the improved warp size of the present invention on polyester filament yarn, resulting in excellent abrasion resistance, low shedding, freedom from skinning and outstanding ease of removal. In addition, the present composition exhibits improved compatibility with tints, which are frequently used in filament yarn slashing.

The polyvinyl alcohol employed in the composition of the present invention should have a degree of hydrolysis of from about 88 to 100 mol % and should have a 4% aqueous solution viscosity in the range of from about 5 to about 50 mPa·s. Preferably the 4% solution viscosity is from about 10 to about 35 mPa·s.

The polyvinyl alcohol can be either a homopolymer or a copolymer. Copolymers can be obtained by alcoholysis (hydrolysis saponification) of copolymers of vinyl acetate with minor quantities of other comonomer, such as acrylate esters, methacrylate esters, maleate esters and alpha-olefins. The mol % range of such comonomer units is from 0 to about 12% in the PVA.

The polyvinyl alcohol is employed in the amount of from about 40 to about 90% by weight of the composition on a dry basis. Preferably polyvinyl alcohol should be present in the amount of from about 50 to about 75%.

The urea component of the present invention is present in the amount of from about 5 to about 30%, preferably from about 10 to about 25% by weight.

The third ingredient of the composition of the present invention is mono- or di-saccharide. These include for example, sucrose, glucose, fructose, maltose, lactose, invert sugar and sorbitol. A most preferred saccharide is sucrose.

The mono- and di-saccharides do not soften the film or cause it to become tacky. Therefore, they are functional in warp sizing when used in combination with urea. They improve adhesion to polyester while glycerol or glycols only function as plasticizers. The solid physical form of the saccharides is an advantage since the sizing composition can be supplied as a dry, free-flowing blend which can be stored dry and dissolved only as needed.

The saccharides are present in the amount of from about 5 to about 30%, preferably from about 10 to about 25% by weight.

For certain styles of yarn and fabric the PVA based warp size of the present invention can also be used advantageously in combination with other aqueous sizes, such as acrylic polymers or polyester dispersions.

Of course, optionally other ingredients may also be included in the warp size of the present invention in order to accomplish some special effect. Accordingly for example, water soluble color may be added to size boxes to color-code yarns from specific section beams.

The warp sizing composition of the present invention is applied to the filament yarn from an aqueous solution having a solids content of from about 3 to about 25 weight percent, and preferably from about 5 to about 12 weight percent. Well known slashing methods are suitable for applying the warp sizing to the filament yarn.

The temperature of the size solution should be between 40° and 90° C. Either single or multiple size boxes may be used. After removal of excess size solution by passage between squeeze rolls, the sized yarn is dried by contact with multiple drying cans heated to temperatures of 100° to 125° C., split by stationary lease rods, and wound as a weaving beam. The slashing operation is conducted at speeds of 10 to 100 meters/min. Essential properties of the size include (a) absence of excessive foaming in the size box, (b) no sticking of polymer to the drying cans, (c) clean splitting at the lease bars without breakage of ends or filaments, and (d) easy separation of the sized yarns when entering into the loom harness.

Weaving may be performed with conventional shuttle looms, air-jet looms, rapier looms or shuttleless weaving machines. Essential characteristics are (a) production of first-quality cloth, (b) loom efficiency of 90% or greater, and (c) absence of loom fouling by powdery or paste-like deposits.

During finishing, the size is removed by scouring with detergent solutions and hot water. It is highly desirable that the size should be completely removed from the cloth, using water at moderate temperatures (50°-80° C.), without the use of chemical additives such as sodium hydroxide or carbonate.

All these desired characteristics are obtained by the use of the compositions disclosed in this application.

The following examples are given for the purpose of illustrating the present invention. All parts and percentages are by weight unless otherwise specified.

EXAMPLE 1

A solution of 750 g of polyvinyl alcohol (degree of hydrolysis 99.0–99.8 mol %, 4% aqueous solution viscosity at 20° C. 27 mPa.s), 225 g of urea, and 225 g of sucrose in 4800 cm$^3$ of water was prepared by heating and stirring at 80° C. The viscous, 20% solids solution, was diluted with water to solids contents of 12.5, 11.0 and 9.2% respectively, before being applied to 100 ends of texturized polyester yarn, using a Callaway slasher operating at about 10 meters/minute. The solutions were clear, and did not foam or form skins in the size box. The slashed yarn produced, at add-on levels of 13.1, 12.0 and 8.8%, respectively, was stiff, compact and well bonded. In abrasion tests, using a reciprocating reed tester at 1 cycle/second for 15 minutes, outstanding freedom from shedding and filament breakage was observed at the 13.1 and 12.0% add-on levels. There was slightly more shedding at 8.8% add-on, but the shed was easily removed and did not fill any of the reed dents.

EXAMPLE 2

Identical to Example 1 except that the proportions were changed as follows: 706 g of polyvinyl alcohol, 282 g of urea and 212 g of sucrose. Add-on levels of 10.0, 9.3 and 8.2% were obtained on the texturized polyester yarn. Results with the abrasion tester were similar to the results in Example 1, but the level of shedding was somewhat higher, and the abraded yarn was more open, and limper.

EXAMPLE 3

409.2 g of polyvinyl alcohol employed in Example 1, 125.4 g of urea and 125.4 g of sucrose were dissolved in 5340 g of water, producing a clear, 10.3% solids solution. This was applied to texturized polyester yarn as in previous examples and gave an add-on of 9.6%. The slashed yarn was found to be excellent in abrasion resistance.

EXAMPLE 4

150 g of "Syltint Blue" (a water-soluble dye solution, available from Sylvan Chemical Corp.) tint was added to 5000 g of the aqueous composition of Example 3. A uniform blue color was obtained on the yarn, although operability was not as good as in Example 3 due to altered wetting characteristics. In the abrasion test, the quantity of shedding was very light. Performance was judged to be very good on an overall basis.

EXAMPLES 5–10

Comparative tests were run by the methods detailed above, on texturized polyester yarn. Size compositions were applied from an aqueous solution having a solids content of 10% by weight. Operability in the slasher was excellent in every case.

| Example | Compostn. (wt. % Dry) PVA | Urea | Sucrose | Add-on wt % | Abrasion Rating |
|---|---|---|---|---|---|
| 5 | 62 | 19 | 19 | 9.0 | Very good. |
| 6 | 62 | 16 | 22 | 8.5 | Slightly more shed than 5. |
| 7 | 62 | 22 | 16 | 8.7 | Fair (filled dents). |
| 8 | 60 | 20 | 20 | 8.7 | Excellent. |
| 9 | 64 | 18 | 18 | 9.1 | Slightly inferior to 6. |
| 10 | 70 | 15 | 15 | 9.4 | Light shed but loose filaments. |

EXAMPLES 11–14

PVA of Example 1 was dissolved in water to produce an 8% by weight solution. Urea and saccharides were added as shown below to give solution blends from which films were cast on Mylar ® polyester. The puncture and abrasion resistances of these films were compared by methods which have been shown to correlate with weaving experience.

| Example | PVA | Urea | Saccharide | Puncture and Abrasion |
|---|---|---|---|---|
| Control | 10g | — | — | Poor |
| 11 | 10g | 3g | Dextrose 3g | Excellent |
| 12 | 10g | 3g | Lactose 3g | Very good |
| 13 | 10g | 3g | Fructose 3g | Excellent |
| 14 | 10g | 3g | Maltose 3g | Very good |

Comparative Example A

Polyvinyl alcohol of Example 1 was dry blended with urea to give a 70/30 uniform mixture and this was dissolved in water to give a 20 wt. % solids solution. During a 4 week period of storage of this solution, the viscosity was found to increase substantially and finally it became a gel.

A 20% solution was also prepared from PVA/urea/sucrose (62/19/19). The viscosity was about 3000 mPa.s and remained at this level after storage for 3 months.

Comparative Example B

PVA of Example 1/urea (70/30) was dissolved in water to give a 7.5 wt.% solution which was applied to 3728 ends of texturized polyester yarn in a West Point slasher. Operation was good, and the size add-on was approximately 5%. Weaving of this yarn on a Sulzer loom gave 91.7% efficiency, but excessive shedding was observed.

PVA of Example 1/urea/sucrose (62/19/19) was dissolved in water and was applied to 4040 ends of texturized polyester yarn, the tints ("Chemurgy Blue" and "Chemurgy Yellow", available from Chemurgy Chemical Company) added to the size boxes in the amount of about 3% by wt. of the size box contents. Solids levels of about 9.5% were used. Satisfactory operation was observed during slashing of 2000 yards. Weaving tests in a Sulzer loom gave >85% efficiency with low shedding and overall acceptable performance. Add-on was about 6.4%.

Comparative Example C 10 g of polyvinyl alcohol of Example 1, 3 g of urea, and 1 g of diethylpropanediol were dissolved in 115 cm$^3$ of water. Cast film had good adhesion to Mylar ® polyester sheet, but was very soft. When applied to smooth polyester yarn at 70° C. abrasion resistance was fair. However, it was also applied to texturized polyester yarn and found to produce an undesirable quantity of shed when subjected to abrasion in the reciprocating reed device.

A similar solution, in which glycerol was substituted for the diethylpropanediol, was also applied to smooth polyester yarn and gave a flat yarn with some irregularities and fair abrasion resistance. This was not considered sufficiently promising to test on texturized yarn.

I claim:

1. A process for sizing filament yarn with a composition consisting essentially of (a) from about 40 to about 90% by weight, on a dry basis, of polyvinyl alcohol having a degree of hydrolysis of from about 88 to about 100 mol % and a solution viscosity of from about 5 to about 50 mPa·s measured as a 4% aqueous solution at a temperature of 20° C., (b) from about 5 to about 30% by weight of urea, and (c) from about 5 to about 30% by weight of saccharide selected from the group consisting of mono- and di-saccharides.

2. The process of claim 1 wherein said polyvinyl alcohol has a solution viscosity of from about 10 to about 35 mPa·s.

3. The process of claim 2 wherein said polyvinyl alcohol is present in the amount of from about 50 to about 75% by weight.

4. The process of claim 3 wherein said saccharide is selected from the group consisting of sucrose, glucose, fructose, maltose, lactose, and invert sugar.

5. The process of claim 4 wherein said saccharide is present in the amount of from about 10 to about 25% by weight.

6. The process of claim 5 wherein said saccharide is sucrose.

7. The process of claim 6 wherein the urea is present in the amount of from about 10 to about 25% by weight.

8. The process of claim 7 wherein a composition consisting essentially of about 60% by weight of polyvinyl alcohol, about 20% by weight of urea and about 20% by weight of sucrose is employed.

9. The process of claims 1, 4, 7 or 8 wherein said composition is employed in the form of an aqueous solution having a solids content of from about 3 to about 25% by weight.

10. The process of claim 9 wherein said aqueous solution has a solids content of from about 5 to about 12% by weight.

* * * * *